(12) United States Patent
Blum

(10) Patent No.: US 7,097,134 B1
(45) Date of Patent: Aug. 29, 2006

(54) WING DEVICE FOR SPORTING ACTIVITIES

(76) Inventor: Daniel Lorenzo Blum, 174 Prospect Pkwy., Burlington, VT (US) 05401

( * ) Notice: Subject to any disclaimer, the term of this patent is extended or adjusted under 35 U.S.C. 154(b) by 152 days.

(21) Appl. No.: 10/805,780

(22) Filed: Mar. 22, 2004

(51) Int. Cl.
*B64C 29/00* (2006.01)
(52) U.S. Cl. .................................. 244/4 A
(58) Field of Classification Search .............. 244/11, 244/155 A, 16, 4 A, 64, 145, 142, 146, 143, 244/900, 902; 280/810, 816, 819; 446/28; 180/2.2
See application file for complete search history.

(56) References Cited

U.S. PATENT DOCUMENTS

| | | | | |
|---|---|---|---|---|
| 68,789 A | * | 9/1867 | Quinby | 244/64 |
| 95,513 A | * | 10/1869 | Quinby | 244/64 |
| 132,022 A | * | 10/1872 | Quinby | 244/64 |
| 370,191 A | * | 9/1887 | Haycock | 424/736 |
| 582,718 A | * | 5/1897 | Chanute | 244/16 |
| 849,971 A | * | 4/1907 | Brandl | 244/64 |
| 912,152 A | * | 2/1909 | Nigro | 244/16 |
| 915,677 A | | 3/1909 | Johnson | 280/810 |
| 2,067,423 A | * | 1/1937 | Sohn et al. | 244/16 |
| 2,181,326 A | * | 11/1939 | Griffin | 244/16 |
| 2,213,754 A | | 9/1940 | Thirring | 280/810 |
| 2,244,444 A | * | 6/1941 | Burgess | 482/51 |
| 3,393,885 A | | 7/1968 | Neumark | 244/145 |
| 3,524,613 A | | 8/1970 | Reuter et al. | 244/142 |
| 3,817,478 A | * | 6/1974 | McDonald | 244/16 |
| 3,830,512 A | | 8/1974 | Spiegel | 280/810 |
| 3,863,868 A | * | 2/1975 | Oberle | 244/16 |
| 3,944,169 A | * | 3/1976 | Bede | 244/16 |
| 4,015,801 A | | 4/1977 | Womble et al. | 244/145 |
| 4,175,722 A | * | 11/1979 | Higgins | 244/152 |
| 4,191,349 A | | 3/1980 | Pravaz | 244/145 |
| 4,220,299 A | | 9/1980 | Motter | 244/143 |
| 4,417,707 A | * | 11/1983 | Leong | 244/11 |
| 4,440,366 A | * | 4/1984 | Keeler et al. | 244/138 R |
| 4,531,763 A | | 7/1985 | Toland | 280/810 |
| 4,756,555 A | | 7/1988 | Bachmann | 280/810 |
| 4,890,861 A | | 1/1990 | Bachmann | 280/810 |
| 5,071,089 A | | 12/1991 | Fagan | 244/16 |
| 5,170,965 A | * | 12/1992 | Yasuda | 244/64 |
| 5,174,529 A | | 12/1992 | Jalbert | 244/145 |

(Continued)

OTHER PUBLICATIONS www.flexifoil.com/products/activity_snowkiting.php; Flexifoil Product Range—Snowkiting.

(Continued)

*Primary Examiner*—Michael J. Carone
*Assistant Examiner*—John A Radi
(74) *Attorney, Agent, or Firm*—Downs Rachlin Martin PLLC

(57) ABSTRACT

A human body attached wing device (20) for use during downhill alpine activities such as skiing and snowboarding. Wing device (20) includes independently operable, mirror image, left and right wings (24) and (26), which may be joined to a user (22) on or about the shoulders via a harness (28) that is worn by user (22). Each of wings (24) and (26) generally include ram-air canopies, (30) and (32), respectively, that inflate during use to form lift-providing airfoils. The surface area of canopy (30) is defined by first and second ends (34) and (36), a leading edge (38), and a trailing edge (40). Canopy (30) may include additional stiffening members to help maintain the shape of wings (24) and (26) when it is either deflated or only partially inflated, or when it is used as an air brake. Canopy (30) may also include flexible triangular struts (110) that stabilize trailing edge (40).

29 Claims, 7 Drawing Sheets

U.S. PATENT DOCUMENTS

| | | |
|---|---|---|
| 5,244,169 A | 9/1993 | Brown et al. .............. 244/146 |
| 5,362,017 A * | 11/1994 | Puckett ..................... 244/146 |
| 5,366,182 A * | 11/1994 | Roeseler et al. ........ 244/155 R |
| 5,412,813 A | 5/1995 | Hosley ........................... 2/69 |
| 5,417,390 A * | 5/1995 | Southwick ............. 244/155 A |
| 5,713,603 A * | 2/1998 | Carter ....................... 280/810 |
| 5,904,324 A * | 5/1999 | Di Bella ................... 244/152 |
| 6,488,232 B1 * | 12/2002 | Moshier ..................... 244/4 A |
| 6,685,135 B1 * | 2/2004 | Geissler ..................... 244/4 A |
| 6,691,954 B1 * | 2/2004 | Harrington et al. ..... 244/155 A |
| 2003/0183721 A1 * | 10/2003 | Wilson ...................... 244/4 A |

OTHER PUBLICATIONS http://wings.avkids.com/Book/Vehicles/Images/wing—man.gif.
http://wings.avkids.com/Book/Vehicles/Images/icarus_01.jpg.

* cited by examiner

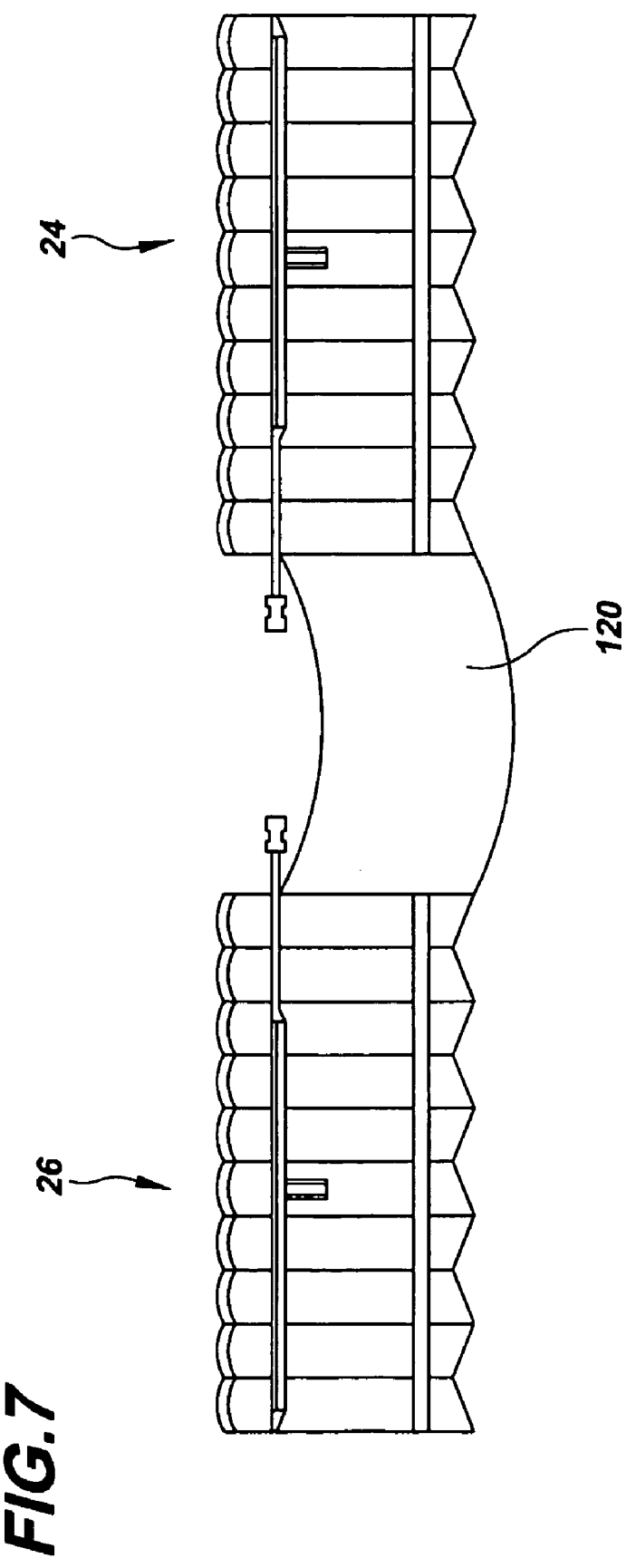

WING DEVICE FOR SPORTING ACTIVITIES

FIELD OF THE INVENTION

The present invention generally relates to the field of human body attached wing devices. In particular, the present invention is directed to a wing device for sporting activities.

BACKGROUND OF THE INVENTION

Various human body attached wing devices are known in the prior art. Earlier devices were designed primarily as flying devices, generated enough lift forces for flight rather than just enough to reduce a user's effective weight. Only later were devices designed specifically for sporting activities such as ice-skating, roller-skating, or downhill alpine activities such as skiing and snowboarding.

Typically, prior art devices have been developed primarily as either aerodynamic braking devices or lift wings. Prior art devices often lack functional versatility in that no single prior art device is believed to effectively offer a combined variety of alternate functionality such as being a stabilizing lift wing, acting as an air brake, serving as a steering aid, and providing propulsion assistance on flat terrain.

Prior art devices are often complex and cumbersome to a user. Many prior art devices are not retractable or adjustable during use and do not offer left and right wings that can be manipulated independent of one another. Further, they are often large and require a significant buffer zone around a user during use. Prior art devices are often obtrusive and threatening to others on the mountain slopes and cannot be manipulated to avoid obstacles on the slopes.

To be effective, prior art devices often require a user to assume a particular body position during use that is not consistent with normal skiing or snowboarding. Prior art devices are often attached to a user below the user's center of gravity, e.g., at or around the user's waist, rather than above their center of gravity, e.g., adjacent a user's shoulders. As a result, prior art devices typically do not assist a user to remain upright during alpine skiing or snowboarding activities.

Prior art devices that are worn by a user rather than those that are attached to user via a tether, e.g., snow kiting or paragliding, fail to include effective airfoils such as ram-air canopies and fail to provide wings that are lightweight, portable, easily attached or detached, and conducive for repeated use. In addition, prior art devices fail to include improved ram-air canopies having stiffening members to better maintain wing shape.

SUMMARY OF THE INVENTION

One aspect of the present invention is a wing device for wear by a user, which includes a user harness having a left shoulder strap and a right shoulder strap, left and right wings each spanning between a first end and a second end, each of the wings including a ram-air canopy, at least one wing control handle connected to the ram-air canopy between the first and second ends for permitting a user to manipulate the ram-air canopy, and a flexible strap proximate the first end. In addition, the left and right wings and the left and right shoulder straps each include attachment means for attaching the flexible strap of the left wing to the left shoulder strap and the flexible strap of the right wing to the right shoulder strap.

Another aspect of the present invention is a wing device for wear by a user, which includes left and right wings each spanning between a first end and a second end, each of the wings including a ram-air canopy and at least one wing control handle positioned between the first and second ends, the at least one wing control handle adapted to be grasped by the user to allow the wings to be manipulated independently of one another and substantially in accordance with the motion of the user's arms, each of the ram-air canopies having a top panel, a bottom panel, and a plurality of vertical ribs and a plurality of sidepieces between the top and bottom panels to define a plurality of air cells, each of the plurality of air cells having an open front portion and a closed rear portion, the open front portion defined by a top edge adjacent to the top panel, a bottom edge adjacent the bottom panel, and left and right sides defined by the vertical ribs, the open front portions combining to define a leading edge of each of the wings, and the closed rear portions defining a trailing edge of each of the wings, and a user harness having a left shoulder strap and a right shoulder strap. In addition, the left and right wings and the left and right shoulder straps each include attachment means for attaching the first end of the left wing to the left shoulder strap and the first end of the right wing to the right shoulder strap.

Another aspect of the present invention is a ram-air canopy including a top panel, a bottom panel, and a plurality of vertical ribs and a plurality of sidepieces between the top and bottom panels defining a plurality of air cells, each of the plurality of air cells having an open front portion and a closed rear portion, the open front portions defining a leading edge of the canopy, and the closed rear portions defining a trailing edge of the canopy, wherein each of the plurality of air cells has a three-dimensional shape and a plurality of stiffening members to substantially maintain the three-dimensional shape independently of whether air is flowing through the plurality of air cells.

Still another aspect of the present invention is a wing device for wear by a user during downhill alpine activities, which includes left and right wings each spanning between a first end and a second end, each of the wings including a ram-air canopy, at least one wing control handle positioned between the first and second ends, and a flexible strap proximate the first end, the at least one wing control handle adapted to be grasped by the user to allow the wings to be manipulated independently of one another and in accordance with the motion of the user's arms, and a mechanism for flexibly attaching said left and right wings to the user.

Yet another aspect of the invention is a wing device including a harness wearable by a user, left and right wings, each including a ram-air canopy, and a connector that connects the ram-air canopy to the harness. In addition, the connector permits the ram-air canopy to be rotated about at least two mutually perpendicular axes relative to the harness when said harness is worn by a user

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 7 is a front view of a wing device according to one embodiment of the present invention.

DETAILED DESCRIPTION OF THE DRAWINGS

Figure 1:
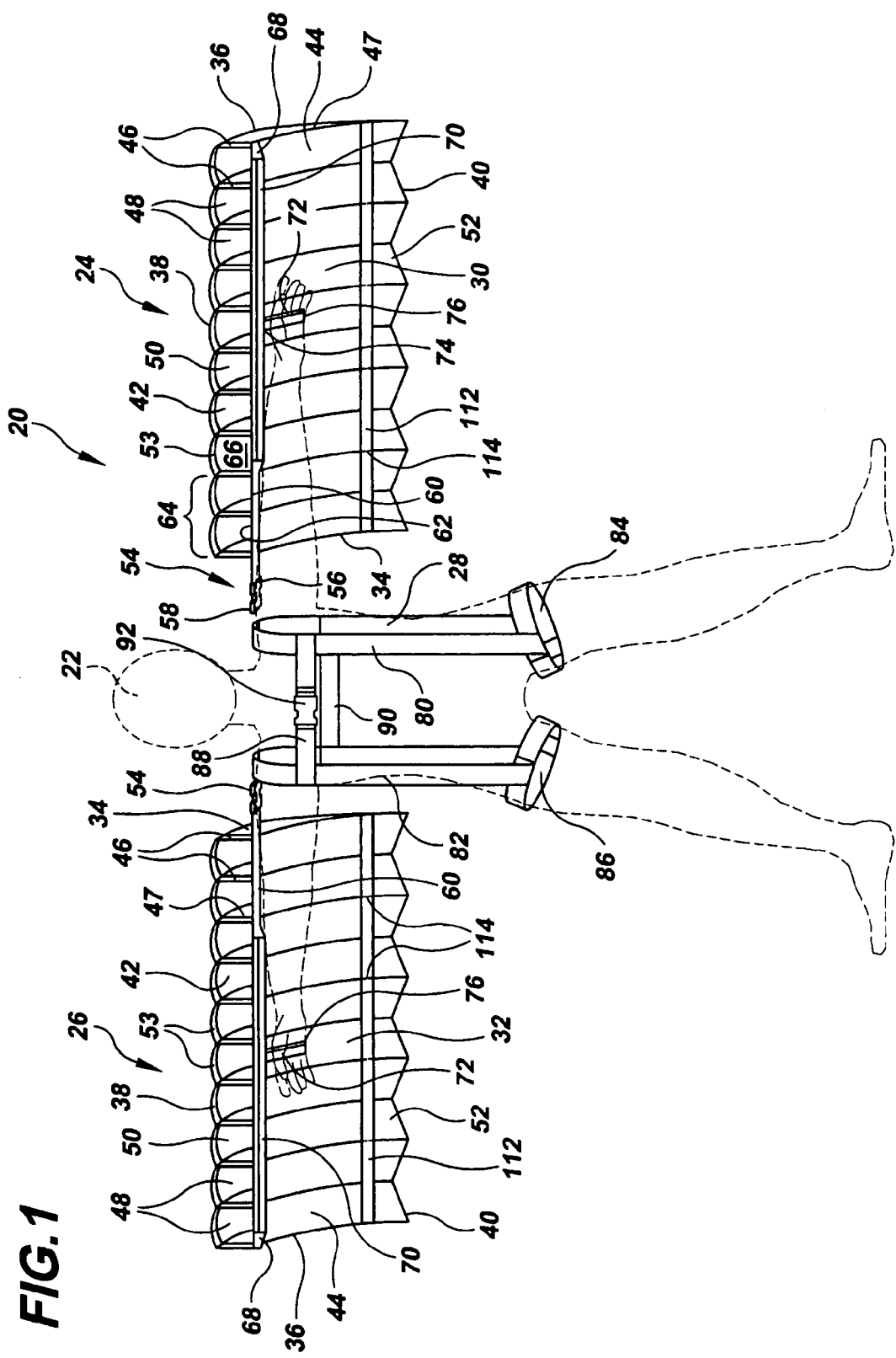
FIG. 1 is a front isometric view of a wing device according to one embodiment of the present invention.

Referring now to the drawings in which like reference numerals indicate like parts, and in particular to FIG. 1, the present invention is a wing device 20 that is worn by a user 22 during downhill alpine activities such as skiing and snowboarding. Wing device 20 includes independently operable, mirror image, left and right wings 24 and 26, which may be joined to user 22 on or about the shoulders via a harness 28 that is worn by the user. Each of wings 24 and 26 generally include ram-air canopies, 30 and 32, respectively, that inflate during use to form lift-providing airfoils.

Figure 2:
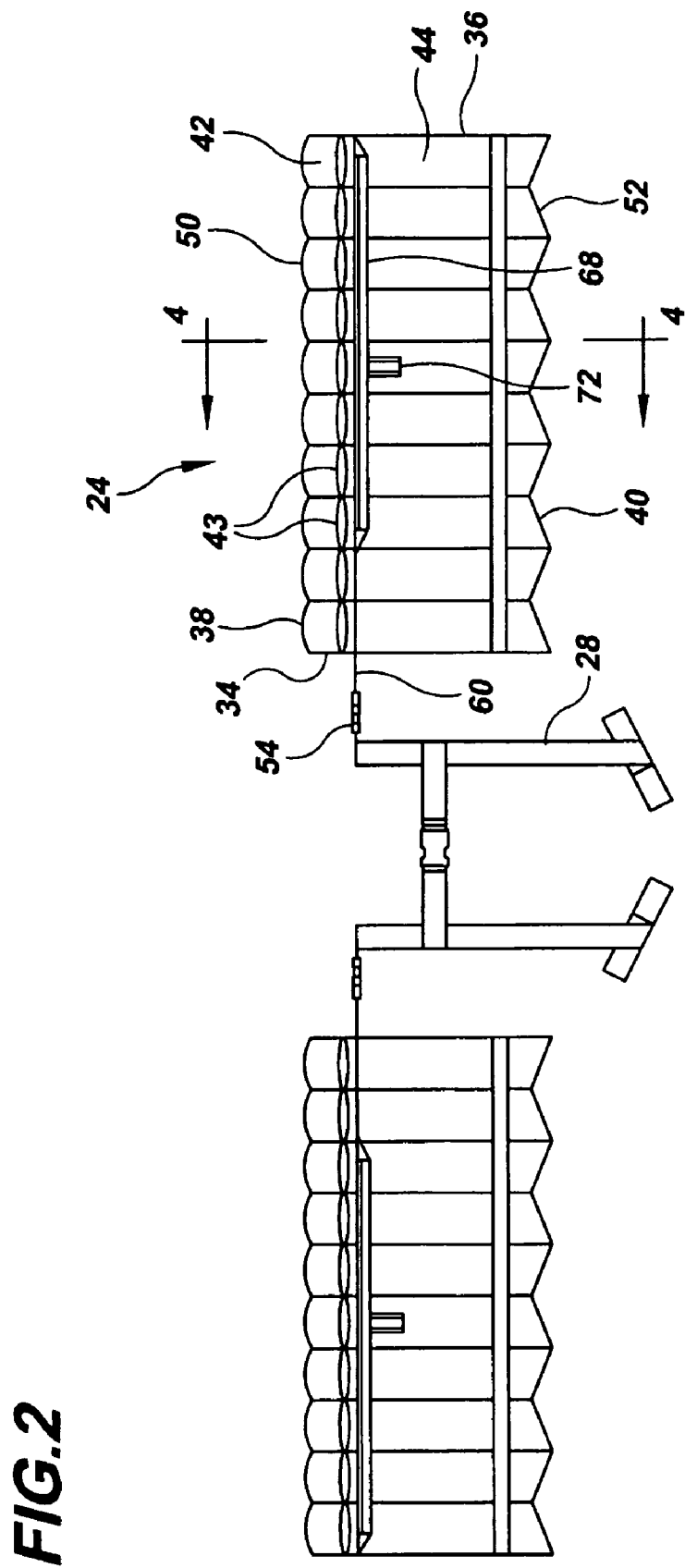
FIG. 2 is a front view of a wing device according to one embodiment of the present invention.
Figure 3:
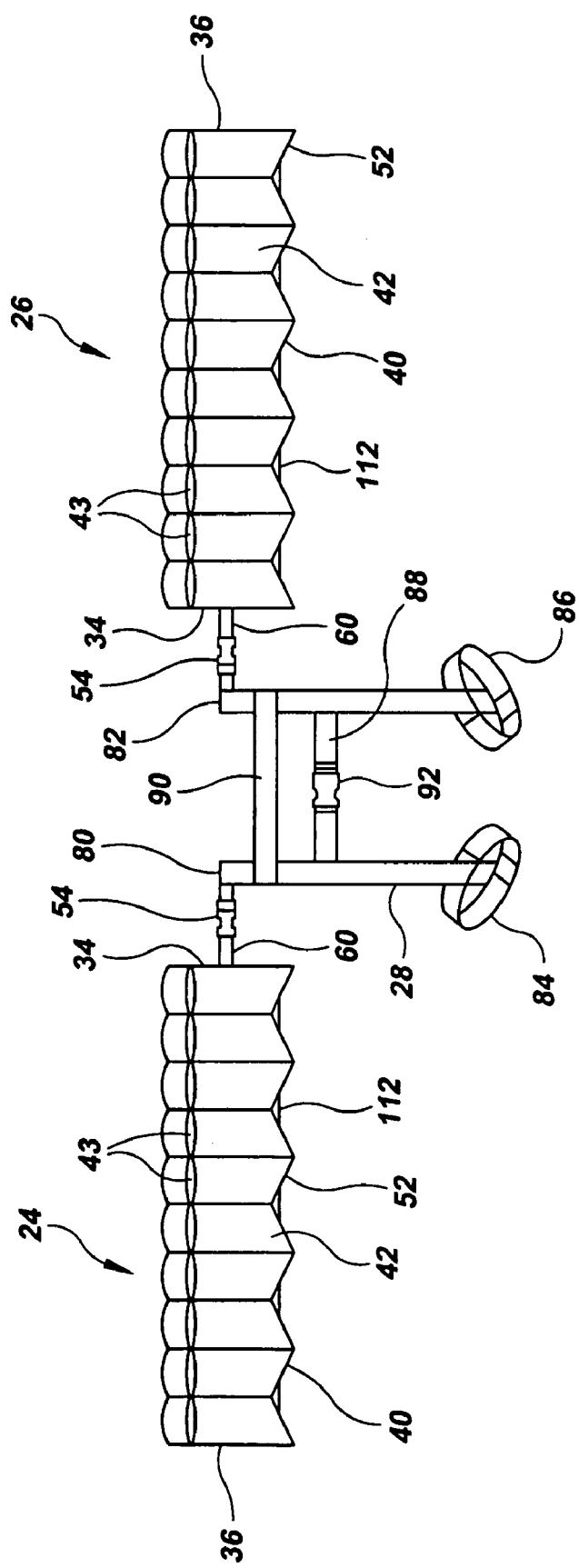
FIG. 3 is a back view of a wing device according to one embodiment of the present invention.

Because wings 24 and 26 are mirror images, only left wing 24 will be described specifically herein. As mentioned above, the drawings are numbered accordingly. Referring now to FIGS. 1–3, left wing 24 includes ram-air canopy 30, which spans between a first end 34 and a second end 36. The surface area of canopy 30 is defined by first and second ends 34 and 36, a leading edge 38, and a trailing edge 40. Although in one embodiment the surface area of canopy 30 may be generally rectangular, in other embodiments, the canopy may be formed to have myriad shapes. Canopy 30 also includes a top panel 42 and a bottom panel 44, both of which cover the surface area defined by ends 34 and 36 and edges 38 and 40. Top panel 42 may be formed from one continuous portion that is rounded and curved to form the top surface of canopy 30, or may be made of multiple portions. Top panel 42 may include one or more rearward opening vents 43 between the interior volume (not shown) of wing 24 and the top panel. Vents 43 may be provided to reduce the air drag of canopy 30 by relieving some of the pressure within wing 24, while also introducing some laminar air flow along top panel 42 thereby reducing the drag from normal air turbulence generated by leading edge 38. Panels 42 and 44 are typically made of a thin lightweight flexible and durable material, like nylon cloth or any one of myriad materials used to fabricate parachutes or ram-air inflating parafoils.

Figure 4:
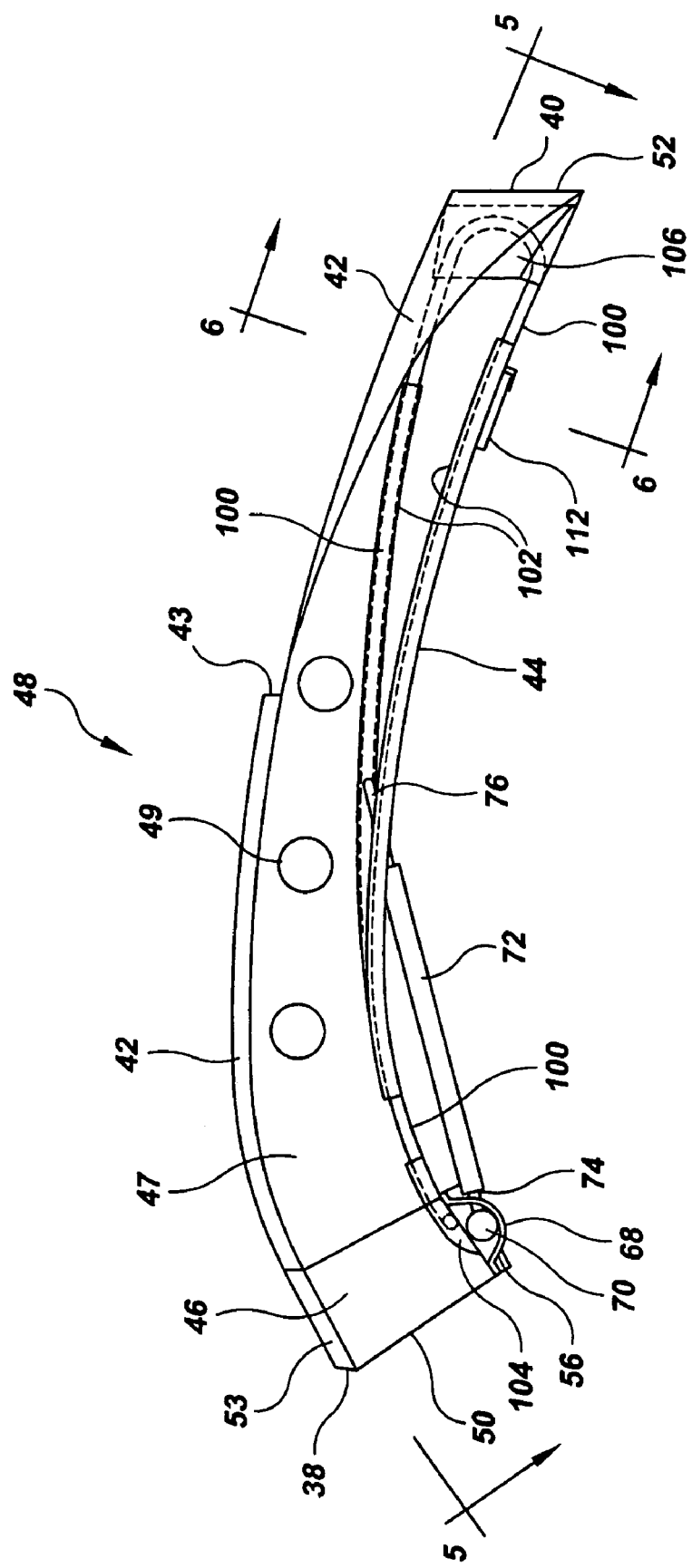
FIG. 4 is a sectional side view taken along line 4—4 of FIG. 2.

Referring now to FIG. 4, top panel 42 and bottom panel 44 are separated by a plurality of vertical stiffening ribs 46 and flexible sidepieces 47 thereby providing an interior volume (not shown) to wing 24 and defining the aerodynamic relationship between the top and bottom panels. Ribs 46 are typically formed from lightweight semi-rigid material such as plastic or material having similar characteristics. Sidepieces 47 may be formed from the same thin lightweight flexible material used to form either of panels 42 or 44, although other material may also be used. Ribs 46 are typically located along leading edge 38 and may be encapsulated within sidepieces 47. Vertical ribs 46 and sidepieces 47 divide wing 24 into a plurality of three-dimensional pockets or air cells 48. Sidepieces 47 may include one or more holes 49 to allow air to pass between air cells 48. Each of air cells 48 has an open front portion 50 and a closed rear portion 52. Open front portions 50 combine to form leading edge 38 and closed rear portions 52 combine to form trailing edge 40. Open front portion 50 is defined by top and bottom panels 42 and 44, which are spaced apart by vertical ribs 46 and sidepieces 47. The top panel 42 along leading edge 38 is forward of bottom panel 44 at open front portion 50 thereby creating an angled opening. This construction facilitates the inflation of cells 48 either when the leading edge of canopy 30 (FIG. 1) is facing into the wind, with the bottom panel underneath and generally parallel to the ground, or when the canopy is positioned adverse to the wind, with the bottom panel of the canopy facing forward and the leading edge of the canopy generally facing upward. Each open front portion 50 may include lightweight semi-rigid stiffening members 53, which are formed from plastic or material having similar characteristics, encapsulated within top panel 42 along leading edge 38 and above vertical ribs 46. Stiffening members 53 and ribs 46 preserve, at least partially, the aperture of each open front portion 50 when canopy 30 is not inflated. At closed rear portion 52, top and bottom panels 42 and 44 are joined to form a closed seam (not shown). Although FIG. 4 shows air cell 48 having a generally curved, rectangular, cross-sectional shape, the air cell may be formed to have myriad cross-sectional shapes so long as the shape provides acceptable aerodynamic performance.

Referring again to FIGS. 1–3, during use, first end 34 is positioned proximate the shoulder of user 22. Adjacent to first end 34, an attachment assembly 54, which includes a first portion 56 and a second portion 58 that is joined to harness 28, is used to releasably attach wing 24 to the harness. In one embodiment, assembly 54 is a snap buckle formed from thermoplastics. Of course, in other embodiments, assembly 54 may include a conventional buckle, straps, or hook and loop fasteners. Continuing from first portion 56 toward second end 36 of wing 24, a flexible strap 60 is joined to bottom panel 44 along leading edge 38 forming a bottom edge 62 of the first two air cells, i.e., air cells 64 (FIG. 1). Flexible strap 60 is configured to permit a user to manipulate wing 24 substantially in conformance with the motion of the user's arm to which the wing is attached. At the third air cell from first end 34, i.e., air cell 66 (FIG. 1), strap 60 forms a leading edge stiffening member sleeve 68, which contains a leading edge stiffening member or leading edge spar 70. Spar 70 acts as a lightweight stiffener to prevent tuck-under or collapse of wing 24 when front portion 50 is positioned downwardly during use. Sleeve 68 and spar 70 form the bottom edge of the remaining air cells, i.e., air cell 66 to second end 36. Strap 60 may be formed from any strong, durable, flexible material suited for outdoor use, e.g., a woven nylon. Spar 70 is formed from tube or rod made of a lightweight strong and fairly rigid material such as metal or plastic.

Bottom panel 44 includes a wing control handle 72, which is grasped by user 22 and manipulated to control the motion and position of wing 24. Handle 72 includes a leading end 74 and a trailing end 76. As best illustrated in FIGS. 1 and 4, handle leading end 74 is typically connected to leading edge spar 70 near the midpoint between first and second ends 34 and 36 to minimize lateral torque on user 22's hands. Handle 72 extends perpendicularly rearward with respect to leading edge 38 towards trailing edge 40, beginning at leading end 74 and terminating at trailing end 76. Trailing end 76 may include a loop or ring that penetrates through and is connected to bottom panel 44 thereby creating a pitch control arm between the leading and trailing halves (not shown) of canopy 30. Handle 72 is formed from a strong and fairly rigid material such as metal, plastic or material having similar characteristics. In addition, handle 72 may include a covering or grip to improve the comfort of user 22.

Although in one embodiment wings 24 and 26 are connected to user 22 on or about the shoulders via a flexible fabric harness 28, in other embodiments, a vest, shirt, coat, jacket or other garment with second portion 58 of attachment assembly 54 mounted on the shoulders may be used in place of the harness. Referring to FIG. 1, in one embodiment, harness 28 includes left and right shoulder straps 80 and 82 that loop over the respective shoulders of user 22 and are connected at each end to left and right leg strap loops 84 and 86, respectively. Harness 28 may also include front and back connecting straps 88 and 90 that join shoulder straps 80 and 82 to one another. Front connecting strap 88 may be divided into two portions that are joined using an attachment assembly 92, which may be the same as or similar to attachment assembly 54. Using attachment assembly 92, harness 28 may be releasably and temporarily connected to user 22. Any or all of the harness straps may or may not be adjustable in length using tabs, buckles, loops or other methods (not shown). Harness 28 may be formed from any strong, durable, flexible material suited for outdoor use, e.g., a woven nylon. As mentioned above, second portion 58 of attachment assembly 54 is generally attached to harness 28. Specifically, each second portion 58, i.e., left and right portions, is attached to a respective shoulder strap 80 or 82 at a position on strap 80 or 82 on or about the top of user 22's respective shoulder. As a result, when user 22 is not grasping handle 72, wing 24 or 26 automatically retracts, falls, or collapses to a position adjacent the user's torso beneath the respective shoulder. In one embodiment, where a snap buckle is used, left and right attachment assemblies 54 are implemented in opposite directions, i.e., right wing 26 uses the male half of the snap buckle and left wing 24 uses the female half of the snap buckle, or vice versa. Such an arrangement allows wings 24 and 26 to either connect to harness 28 or to each other. As one skilled in the art will appreciate, harness 28 may have myriad configurations that are suitable for use as part of wing device 20.

Figure 5:
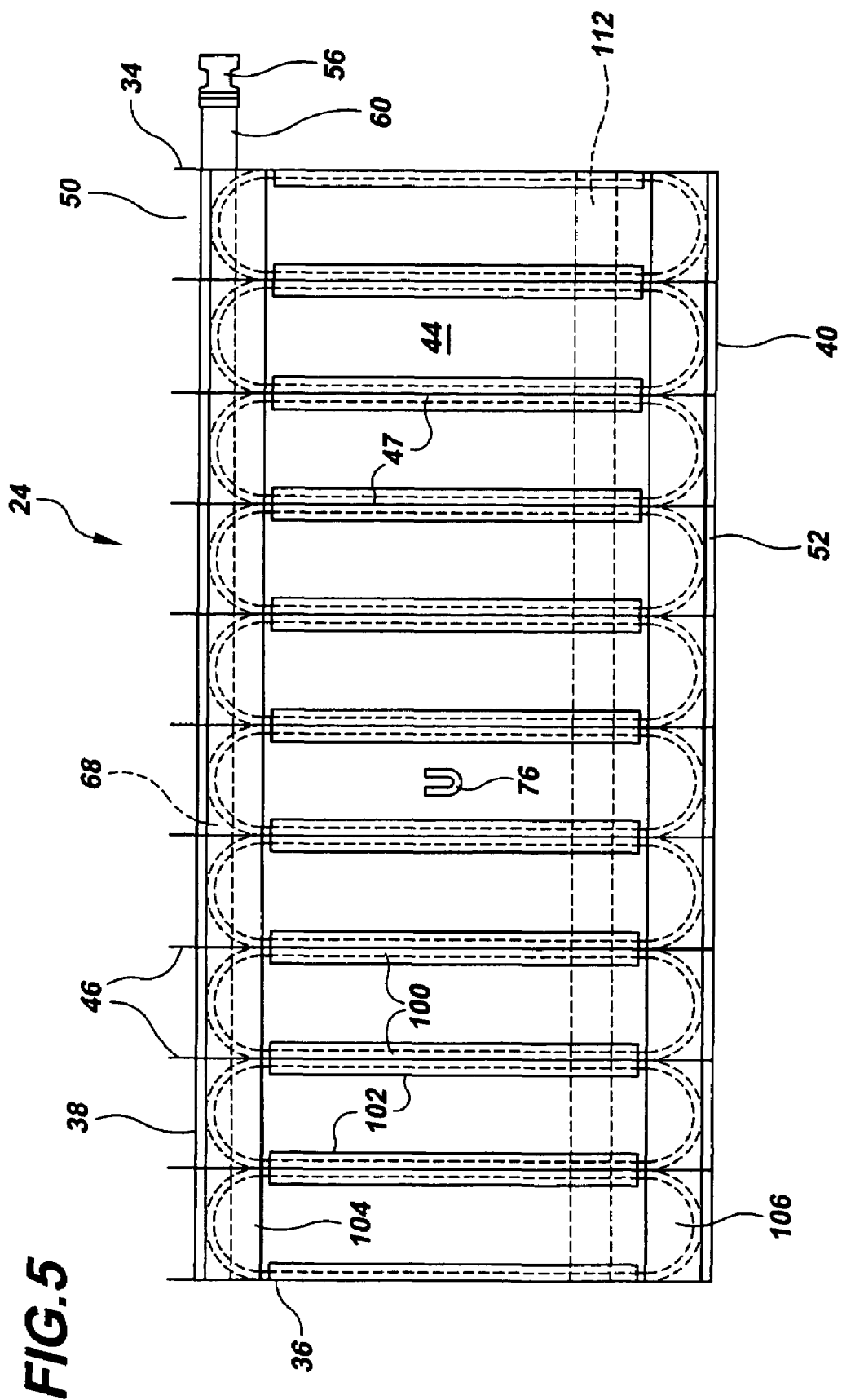
FIG. 5 is a sectional bottom interior view taken along line 5—5 of FIG. 4.
Figure 6:
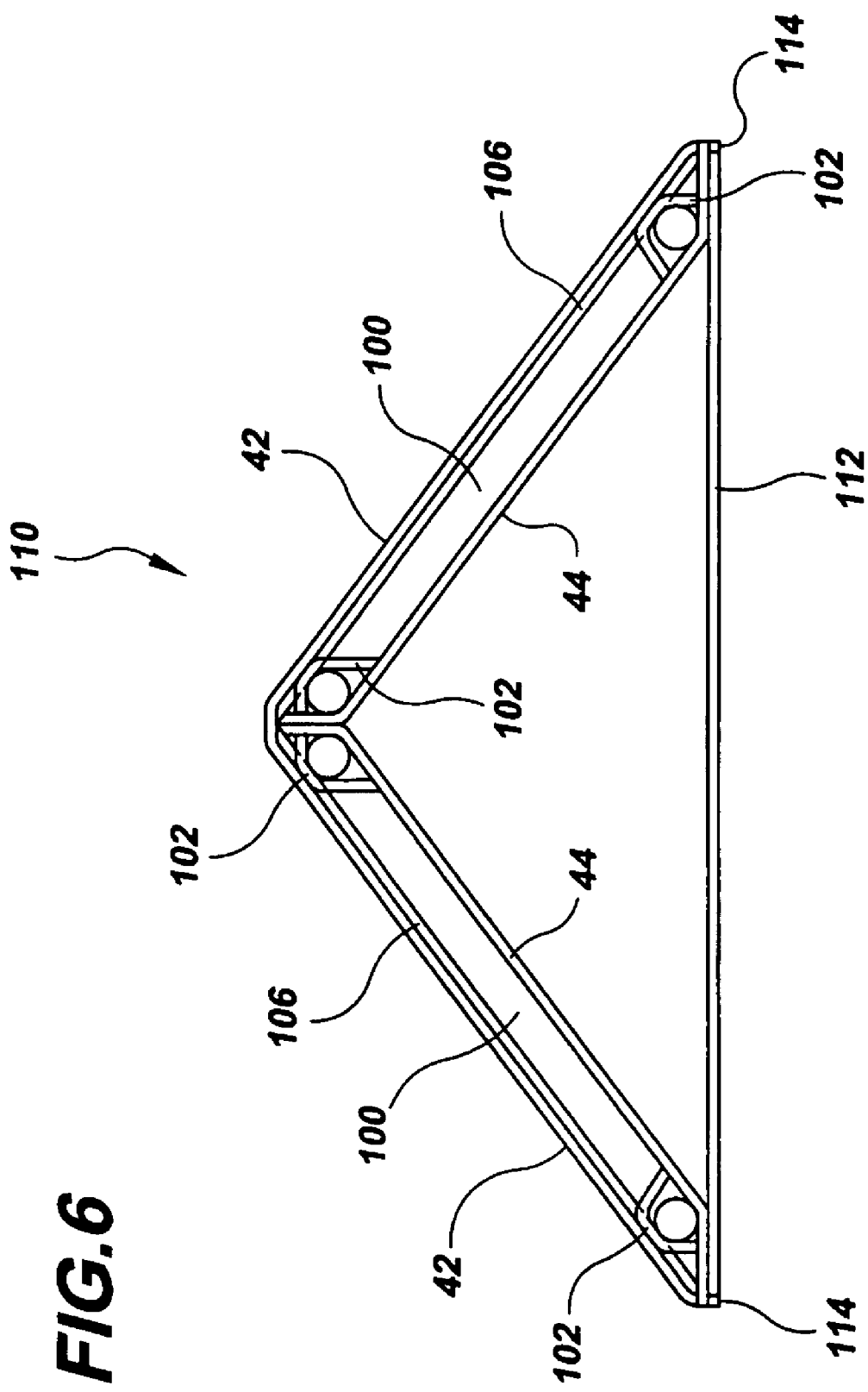
FIG. 6 is a sectional trailing end view taken along line 6—6 of FIG. 4.

Referring now to FIGS. 4–6, canopy 30 may include additional stiffening members to help maintain the shape of wing 24 when it is either deflated or only partially inflated, or when wing 24 is being used as an air brake. In one embodiment, a lightweight semi-rigid batten 100, made of plastic or material having similar characteristics, is positioned on bottom panel 44 within each of air cells 48. Each batten 100 is generally a continuous loop that runs along the outer edges of bottom panel 44 and is retained by flexible casings 102 formed adjacent each sidepiece 47 as well as a leading end pocket 104 and a trailing end pocket 106 formed at respective ends of the bottom panel. The casings 102, leading pockets 104, and trailing pockets 106 are formed from the same thin lightweight flexible materials used to form either of panels 42 or 44.

Wing 24 may also include a series of flexible triangular struts 110 that stabilize trailing edge 40 of canopy 30. A flexible outer strap 112 runs along the outside of bottom panel 44 proximate and generally parallel the trailing edge 40 of canopy 30 and is connected to the bottom panel at connection points 114, which are positioned under every other sidepiece 47. The length of the segment of outer strap 112 between each connection point 114 is less than the combined width of the two air cells 48 under which it spans. The combination of the compression of battens 100 within the two air cells 48, and the tension of outer strap 112 causes the two air cells 48 proximate the strap to fold toward one another so as to create triangularly shaped stabilizing strut 110. Outer strap 112 may be formed from any strong, durable, flexible material suited for outdoor use, e.g., a woven nylon.

During use of wing device 20, user 22 first adorns harness 28. Next, user 22 attaches each of left and right wings 24 and 26 using attachment assembly 54. User 22 grasps handles 72, which are located underneath bottom panel 44 of each wing. User 22 utilizes each handle 72 to independently manipulate respective wings 24 and 26 in accordance with the user's arms as they proceed downhill during alpine skiing or snowboarding activity. With wings extended, to maximize speed and lift, user 22 manipulates wings 24 and 26 so that the plane substantially containing top panel 42 and bottom panel 44 is generally parallel to the ground surface. Using wings 24 and 26 as a brake to reduce or minimize speed, user 22 manipulates each of the extended wings so that the plane substantially containing top panel 42 and bottom panel 44 is generally perpendicular to the ground surface. To steer, user 22 may alternately use either left wing 24 or right wing 26 as a braking device creating an unbalanced drag on the respective side. User 22 may also ski or snowboard conventionally while wearing wing device 20 by releasing both handles 72 thereby allowing each of wings 24 and 26 to automatically collapse or fall to a position next to the user's torso or back. It should be understood that a proficient user 22 can independently manipulate the wings to whatever position or orientation they find most advantageous.

Referring now to FIG. 7, in an alternative embodiment of the present invention, wings 24 and 26 are joined together by a connecting portion 120. Connecting portion 120 provides additional surface area to canopies 30 and 32 and typically is positioned during use behind user 22's head or back. Connecting portion 120 may be formed from a flexible material similar to that used to form either top and bottom panels 42 and 44.

Wing device 20 is sized according to the size and weight of a user so that it fits the user comfortably and provides lift insufficient for flight. In one embodiment, wing device 20 is sized so that it provides enough lift to support 50% of the user's weight assuming a maximum speed of 35 miles per hour. In other embodiments, the degree of lift with respect to a user's weight may be greater than or less than 50% depending on the activity.

The design of wing device 20 encompassed by the present invention offers multiple benefits over prior art devices. The use of ram-air inflating multi-cell canopy wings with multiple panels provides improved aerodynamic lift performance for the skier while minimizing the necessary wing size and making the wings less obtrusive to other people. The wings are mostly pliant for safety, yet maintain their general shape and surface area when positioned at all angles against the wind to improve the braking performance.

The use of a flexible connector strap enables a full range of motion, i.e., with respect to a user's arms, allowing the wings to be independently and selectively positioned and adjusted during use. For example, the flexible connector strap allows a user to rotate both their arms and attached wings around a plurality of axes. A user may rotate their arms and attached wings around a first axis defined by the user's body, i.e., with arms moving substantially parallel to the ground. Each arm and attached wing may be rotated approximately 180 degrees around the first axis. A user may rotate their arms and attached wings in a motion perpendicular to the ground, and around a second axis perpendicular to the length of an upright user, i.e., up and down at the user's sides. Each arm and attached wing may be rotated approximately 180 degrees around the second axis. A user may rotate their arms and attached wings around a third axis defined by the length of the user's extended arms. Each arm and attached wing may be rotated at least 180 degrees around the third axis.

Depending on position, the wings can be used as an aerodynamic lift wing applying an upward force on the user's upper body, or alternatively the wings can be turned against the wind to use the air resistance as a braking force. By positioning only one wing as a drag against the wind, the wings can be used to facilitate turning or steering of the user. The flexible connector strap also permits the user to quickly extend the wings outward for more effect, or just as quickly retract the wings closer to the body when in close proximity to others or an obstacle. The full range of motion permitted by the flexible connector strap, while attached at the user's shoulder, makes it quite natural to use the wings in a side-to-side or flapping motion to help propel the user on flat ground. The wing action is independent of the user's body position.

There are typically two points of contact between each wing and the user, the shoulder attachment assembly and the centrally located handle grasped by the user's hand. The use of multiple contacts between the wing and user improves the distribution of the aerodynamic forces acting on the wing, allowing the wings to be used to greater effect with less stress on the user.

The use of the stiffening members and ribs ensures the rapid and thorough inflation of the air cells, as well as improving the appearance of the wing device while not inflated. The battens stiffen the bottom panels in the fore-to-aft direction, as well as in the side-to-side direction along the leading and trailing edges. Each batten is a continuous loop to eliminate any end cross-sections that could potentially hurt the skier or others during a fall or collision. The rear strut, created by the rear strap combined with the battens running along the interior of each air cell, stabilizes the trailing edge and helps maintain the shape and surface area of the canopy when the wing is turned sideways and used as an air brake. In addition, the rear strut replaces the need for multiple guidelines commonly used in parafoil canopies to maintain the integrity of the wing shape while in use.

The use of snap buckles as the attachment assembly allows a quick and easy attachment and detachment of the wings for storage and transport. For example, the user can easily unclip the wings to carry them on a chairlift, and then quickly clip them on at the top of the mountain for immediate use on the ski slopes. This can be repeated numerous times during an outing if desired.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A wing device for wear by a user, the device comprising:
 a user harness having a left shoulder strap and a right shoulder strap;
 left and right wings each spanning between a first end and a second end, each of said wings including:
  a ram-air canopy;
  at least one wing control handle connected to said ram-air canopy between said first and second ends for permitting a user to manipulate said ram-air canopy, and a flexible strap proximate said first end;
 wherein said left and right wings and said left and right shoulder straps each include attachment means for attaching said flexible strap of said left wing to said left shoulder strap and said flexible strap of said right wing to said right shoulder strap.

2. A wing device according to claim 1, wherein each of said ram-air canopies has a top panel, a bottom panel, and a plurality of vertical ribs and a plurality of sidepieces between said top and bottom panels to define a plurality of air cells, each of said plurality of air cells having an open front portion and a closed rear portion, said open front portion defined by a top edge adjacent said top panel, a bottom edge adjacent said bottom panel, and left and right sides defined by said vertical ribs, said open front portions combining to define a leading edge of each of said wings, and said closed rear portions defining a trailing edge of each of said wings.

3. A wing device according to claim 2, wherein each of said plurality of air cells defines a three-dimensional shape and said device further comprises stiffening means positioned along said leading edge, in said top, side, and bottom edges of said open front portion, and on said bottom panel, for maintaining said shape of said air cells.

4. A wing device according to claim 2, wherein said open front portion includes stiffening members along said top, side, and bottom edges.

5. A wing device according to claim 2, wherein said bottom panels include stiffening members.

6. A wing device according to claim 2, further comprising:
   an outer strap joined at a plurality of positions along said bottom panel; and
   stiffening members joined with said bottom panel, said outer strap and said stiffening members defining a stiffening strut adjacent said rear portion.

7. A wing device according to claim 1, wherein said attachment means are selected from the group consisting of a snap buckle, a conventional buckle, a strap, a tie, and a hook and loop fastener.

8. A wing device according to claim 1, wherein each of said wing control handles is adapted to be grasped by the hand of a user.

9. A wing device according to claim 2, wherein each of said wing control handles includes a leading handle end and a trailing handle end, said leading handle end attached to said bottom panel proximate said leading edge and said trailing handle end attached to said bottom panel at any point from about the mid-point between said leading and trailing edges to said trailing edge.

10. A wing device according to claim 2, wherein each of said plurality of sidepieces includes holes to allow air to flow between adjacent air cells.

11. A wing device according to claim 2, wherein one or more of said plurality of air cells includes one or more vents, said vents defined by openings in said top panel.

12. A wing device according to claim 1, further comprising a connecting portion joining said right and left wings.

13. A wing device according to claim 1, wherein each of said wings is adapted to automatically retract adjacent the user if the user is not grasping said at least one wing control handle.

14. A wing device for wear by a user, said device comprising:
   left and right wings each spanning between a first end and a second end, each of said wings including a ram-air canopy and at least one wing control handle positioned between said first and second ends, said at least one wing control handle adapted to be grasped by the user to allow said wings to be manipulated independently of one another and substantially in accordance with the motion of the user's arms, each of said ram-air canopies having a top panel, a bottom panel, and a plurality of vertical ribs and a plurality of sidepieces between said top and bottom panels to define a plurality of air cells, each of said plurality of air cells having an open front portion and a closed rear portion, said open front portion defined by a top edge adjacent said top panel, a bottom edge adjacent said bottom panel, and left and right sides defined by said vertical ribs, said open front portions combining to define a leading edge of each of said wings, and said closed rear portions defining a trailing edge of each of said wings; and
   a user harness having a left shoulder strap and a right shoulder strap;
   wherein said left and right wings and said left and right shoulder straps each include attachment means for attaching said first end of said left wing to said left shoulder strap and said first end of said right wing to said right shoulder strap.

15. A wing device according to claim 14, wherein each of said plurality of air cells defines a three-dimensional shape and said device further comprises stiffening means positioned along said leading edge, in said top, side, and bottom edges of said open front portion, and on said bottom panel, for maintaining said shape of said air cells.

16. A wing device according to claim 14, wherein said open front portion includes stiffening members along said top, side, and bottom edges.

17. A wing device according to claim 14, wherein said bottom panels include stiffening members.

18. A wing device according to claim 14, further comprising:
   an outer strap joined at a plurality of positions along said bottom panel; and
   stiffening members joined with said bottom panel, said outer strap and said stiffening members defining a stiffening strut adjacent said rear portion.

19. A wing device according to claim 14, wherein each of said wings is adapted to automatically retract adjacent the user if the user is not grasping said at least one wing control handle.

20. A wing device for wear by a user during downhill alpine activities, said device comprising:
   left and right wings each spanning between a first end and a second end, each of said wings including a ram-air canopy, at least one wing control handle positioned between said first and second ends, and a flexible strap proximate said first end, said at least one wing control handle adapted to be grasped by the user to allow said wings to be manipulated independently of one another and in accordance with the motion of the user's arms; and
   means for flexibly attaching said left and right wings to the user.

21. A wing device according to claim 20, wherein each of said ram-air canopies has a top panel, a bottom panel, and a plurality of vertical ribs and a plurality of sidepieces between said top and bottom panels to define a plurality of air cells, each of said plurality of air cells having an open front portion and a closed rear portion, said open front portion defined by a top edge adjacent to said top panel, a bottom edge adjacent said bottom panel, and left and right sides defined by said vertical ribs, said open front portions combining to define a leading edge of each of said wings, and said closed rear portions defining a trailing edge of each of said wings.

22. A wing device according to claim 21, wherein each of said plurality of air cells defines a three-dimensional shape and said device further comprises stiffening means positioned along said leading edge, in said top, side, and bottom edges of said open front portion, and on said bottom panel, for maintaining said shape of said air cells.

23. A wing device according to claim 21, wherein said open front portion includes stiffening members along said top, side, and bottom edges.

24. A wing device according to claim 21, wherein said bottom panels include stiffening members.

25. A wing device according to claim 21, further comprising:
   an outer strap joined at a plurality of positions along said bottom panel; and stiffening members joined with said bottom panel, said outer strap and said stiffening members defining a stiffening strut adjacent said rear portion.

26. A wing device comprising:
a. a harness wearable by a user;
b. left and right wings, each including a ram-air canopy; and
c. a connector that connects said ram-air canopy to said harness, wherein said connector permits said ram-air canopy to be rotated about at least two mutually perpendicular axes relative to said harness when said harness is worn by a user.

27. A device according to claim 26, wherein said harness has a portion that is located proximate the shoulders of the user when said harness is worn by the user and said connector is connectable to said portion.

28. A device according to claim 26, wherein said connector permits said ram-air canopy to be rotated about each of said at least two mutually perpendicular axes through at least 90 degrees of movement.

29. A device according to claim 26, wherein each of said left and right wings further includes at least one wing control handle.

* * * * *